United States Patent [19]

Hooker

[11] Patent Number: 5,787,286
[45] Date of Patent: Jul. 28, 1998

[54] METHOD AND SYSTEM FOR TABULATION OF EXECUTION PERFORMANCE

[75] Inventor: Richard Arthur Hooker, So. Burlington, Vt.

[73] Assignee: International Business Machines Corporation, Armonk, N.Y.

[21] Appl. No.: 541,363

[22] Filed: Oct. 10, 1995

[51] Int. Cl.[6] .............................. G06F 11/34; G06F 9/45
[52] U.S. Cl. ........................... 395/704; 395/183.14
[58] Field of Search .................... 395/568, 183.14, 395/704, 706

[56] References Cited

U.S. PATENT DOCUMENTS

| | | | |
|---|---|---|---|
| 4,086,470 | 4/1978 | Ashbee | 235/92 DP |
| 4,785,416 | 11/1988 | Stringer | 364/200 |
| 4,975,839 | 12/1990 | Nakatsuka et al. | 364/200 |
| 5,265,254 | 11/1993 | Blasciak et al. | 395/700 |
| 5,297,274 | 3/1994 | Jackson | 395/500 |
| 5,333,304 | 7/1994 | Christensen et al. | 395/575 |
| 5,351,201 | 9/1994 | Harshbarger, Jr. et al. | 364/551.01 |
| 5,390,305 | 2/1995 | Takahaski et al. | 395/375 |

OTHER PUBLICATIONS

Schuette et al., "Exploiting Instruction-level Resource Parallelism for Transparent, Integrated Control-Flow Monitoring", *Digest of Papers, Fault Tolerant Computing: Twenty-First International Symposium*, IEEE, Jun. 25-27, 1991, pp. 318-325.

*Primary Examiner*—William M. Treat
*Attorney, Agent, or Firm*—Heslin & Rothenberg, P.C.

[57] ABSTRACT

A digital computer is operated such that the execution performance of instructions executing thereon is tabulated without degrading execution performance thereof. Specifically, while the instructions are being executed, a tabulation instruction is executed by a free resource of the processor. The tabulation instruction tabulates the execution performance of the instructions being executed without degrading the execution performance thereof. The tabulation instruction is inserted into a computer program by compiling instructions into a compiled program, determining at least one bubble in the compiled program and inserting the tabulation instruction into the bubble within the compiled program.

33 Claims, 2 Drawing Sheets

METHOD AND SYSTEM FOR TABULATION OF EXECUTION PERFORMANCE

TECHNICAL FIELD

The present invention relates in general to benchmark tests for evaluating the performance of computers. More specifically, the present invention relates to a method and system for tabulating the execution performance of instructions executing on a superscalar processor.

BACKGROUND OF THE INVENTION

As new processors (e.g., Complex Instruction Set and Reduced Instruction Set microprocessors) are developed, it is important to be able to fairly and accurately determine the performance of such processors both in absolute terms and relative to each other. To that end, many software implemented "benchmark" tests have been developed that evaluate the performance of processors. For example, software benchmarks that test floating point instruction performance of processors include those known in the art as Whetstone and SPECfp92.

Methods for benchmarking the performance of instructions in a processor include instruction tabulation which comprises counting a number of instructions executed. If the number of instructions executed within a processor's execution units over time is known, the performance of the processor is determined by summing the numbers of instruction executed by each execute unit. However, several problems plague conventional methods for tabulating instructions.

Hardware based instruction tabulation involves the connection of specialized hardware to a processor such that its performance may be measured. However, the attachment of external hardware 'probes' to a processor places additional loading on monitored lines and causes variations in the performance of the processor, thereby distorting performance measurements. Further, hardware methods are limited because 'real time' operational tabulation of instructions is not possible. As with any hardware based method, additional economic cost is incurred.

Software based instruction tabulation comprises the placing of counters within the program (i.e., code segment) being studied. Unfortunately, these counters (instructions) occupy processing time themselves, and therefore degrade execution performance and distort the resultant measurements. Thus, tabulation instructions are conventionally placed in a program before and after a code segment being studied such that the tabulation instructions themselves do not occupy any processor time. This, however, prevents real-time performance data from being collected while the code segment being studied executes.

Therefore, a need exists for a real-time, software only, instruction tabulation technique. The present invention is directed toward satisfying this need.

DISCLOSURE OF THE INVENTION

Briefly summarized, in a first aspect, the present invention includes a method for operating a processor of a digital computer to tabulate execution performance of a first plurality of instructions executing thereon without degrading the execution performance thereof. The method includes executing the first plurality of instructions on the processor. During the execution of the first plurality of instructions, at least one tabulation instruction is executed by a free resource of the processor. The at least one tabulation instruction tabulates the execution performance of the first plurality of instructions such that the execution performance of the first plurality of instructions is not degraded by the execution of the at least one tabulation instruction.

As an enhancement, the processor may comprise a superscalar processor having a first execute unit and a second execute unit. The free resource comprises the second execute unit. At least some of the first plurality of instructions are executed using the first execute unit, while the at least one tabulation instruction is executed using the second execute unit. Further, the first execute unit may comprise a floating point execute unit and the first instruction set may include a plurality of floating point instructions. Accordingly, executing the at least one tabulation instruction may comprise tabulating the execution performance of the plurality of floating point instructions.

As a further enhancement, the second execute unit may comprise an integer execute unit and the at least one tabulation instruction may comprise at least one integer instruction. Thus, using the integer execute unit, the at least one integer instruction is executed to tabulate the execution performance of the plurality of floating point instructions executed by the floating point execute unit without degrading the execution performance thereof.

A corresponding system to the above discussed method is also disclosed.

In another aspect, the present invention includes a method for inserting at least one tabulation instruction into a computer program comprising a first plurality of instructions. The at least one tabulation instruction tabulates execution performance of the first plurality of instructions without degrading the execution performance thereof. The method comprises compiling the first plurality of instructions into a compiled program and determining at least one bubble within the compiled program. The bubble comprises a location where the tabulation instruction, if located, would not degrade the execution performance of the first plurality of instructions. The method further includes inserting the tabulation instruction into the bubble within the compiled program.

As an enhancement, the inserting of the at least one tabulation instruction may comprise identifying a source code location in the first plurality of instructions that corresponds to the bubble, and inserting at least one source code instruction representative of the at least one tabulation instruction into the first plurality of instructions at the source code location. The method may then include recompiling the first plurality of instructions.

To summarize, the present invention has many advantages and features associated with it. By using bubbles or voids in compiled program code to identify locations for tabulation instructions, the art of performance analysis has been advanced. The instructions which are inserted into these bubbles and which perform instruction tabulation execute in zero effective time with respect to the surrounding code. Thus, performance is calculated in real time, during execution of the code segment under study, using only software. All of this is achieved without degrading the execution performance of the code segment under study. Through the use of these techniques, performance measurements are more easily obtained, are more accurate, and thus present a fairer comparison of processor performance.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description of a preferred embodiment and the accompanying drawings in which:

DETAILED DESCRIPTION OF THE PREFERRED EMBODIMENT

Current superscalar processors (e.g., RISC microprocessors) typically contain several execution units such as, for example, at least one floating point execution unit and at least one integer execution unit that work together within a pipelined architecture to efficiently execute instructions. Compilers that are used to generate machine level code for such processors are designed to make the most efficient use of the processor's resources (e.g., execute units) by keeping them occupied at all times and keeping their respective pipelines full.

Unfortunately, due to the well understood complexities of compiler design for superscalar processors, a compiler can not always keep each execute unit busy at all times. When the compiler detects that an execute unit may be free due to the compiler's knowledge of the processor's scheduler, it will insert an instruction into the resultant compiled code as a "placeholder" to keep the free execute unit's pipeline from emptying. The location of such a placeholder is referred to in the art as a "void" or "bubble." As more specific examples, an "integer bubble" comprises a location at which the integer execution unit is free and a "floating point bubble" comprises a location at which the floating point execution unit is free.

The techniques of the present invention use these "bubbles" to facilitate instruction tabulation without affecting the execution performance of the instructions being tabulated. In short, an integer tabulation instruction can be inserted into an integer bubble within a floating point intensive program without affecting floating point performance (or the performance of other surrounding instructions). Conversely, a floating point tabulation instruction can be inserted into an floating point bubble within an integer intensive program without affecting integer performance (or the performance of other surrounding instructions). Thus, such instructions are ideal for instruction tabulation, in real time, during execution of the code segment under study.

Figure 1:
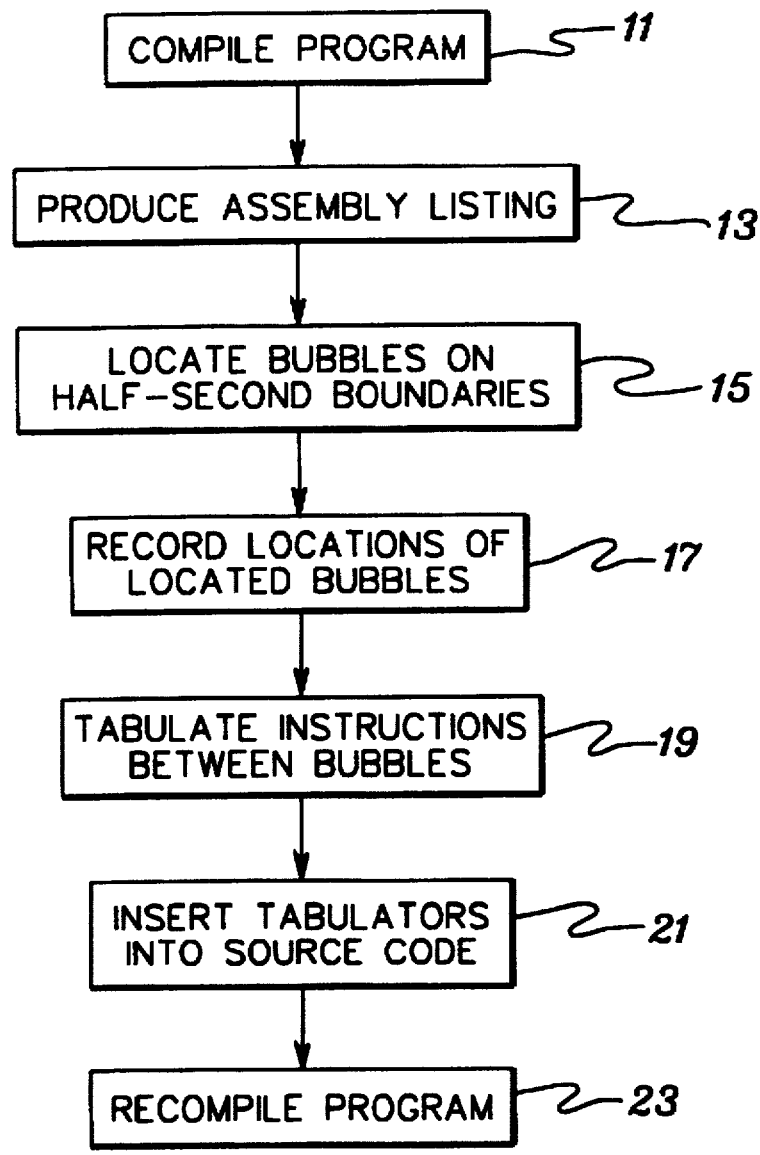
FIG. 1 is a flow diagram of a method for creating a program with instruction tabulators that do not affect execution performance of the code segment being studied pursuant to one embodiment of the present invention.

One method for creating a program with "free" tabulators that do not affect execution performance of the code segment under study is shown in the flow diagram of FIG. 1. Initially, a program is compiled (step 11) that contains a code segment for benchmarking (i.e., study). An appropriate compiler directive is used during compilation such that an assembly listing of the resultant code is produced (step 13). Such a compiler directive will vary with the particular compiler being used, will be apparent to one of ordinary skill in the art and may comprise, for example, the "-S" directive for the xlC compiler from IBM.

A next step comprises determining where the bubbles (or voids) are located within the assembly listing (step 15). In this example, tabulators are desirable approximately every half-second, so the assembly listing is examined for bubbles on approximately half-second boundaries. However, tabulators may be inserted at other intervals such as, e.g., every bubble, or on a less or more periodic basis than one-half second boundaries. In order to locate bubbles on a periodic time basis, an assembly listing (e.g., using the "-S" directive discussed above) is required which includes the program counter corresponding to each instruction executed. With knowledge of the clock speed of the processor one of ordinary skill can then readily locate areas of the assembly listing on the desired periodic basis.

The program addresses within the assembly code that correspond to the bubbles are recorded (step 17), and the number of operation types to be tabulated that are located between the bubbles (which will be replaced with tabulator instructions) are counted (step 19). For example, if the number of floating point operations are being tabulated, and 100 floating point instructions are located between a first tabulator location (e.g., an integer bubble) and a second tabulator location (e.g., a next integer bubble), the second tabulator instruction would comprise an integer type instruction that increments the count of floating point instructions executed by 100.

In order to insert tabulation instructions into the assembled code, source code tabulation instructions are inserted into the program's source code (step 21) at locations corresponding to the bubbles in the assembly listing. Identifying this correspondence is performed through conventional program analysis, and once performed, source code tabulators may be inserted therebetween. Thus, when recompiled (step 23), the tabulator instructions will take the place of the "placeholder" instructions previously placed by the compiler into the bubbles. The tabulators will therefore not occupy any execution time with respect to the surrounding instructions. Thus, instruction tabulation without affecting execution performance of the code segment being studied is facilitated.

Shown below is an example of program code at each stage of the above described process. Specifically, the program code listing below comprises original source code, original assembly code with bubbles, source code with tabulators inserted and assembly code with tabulators in place of the previous bubbles. In the below examples, tabulators have been inserted once per loop such that tabulation is performed for each iteration of the loops shown.

Original Source Code

Shown below is original "C" language source code for a code segment comprising floating point operations. Tabulation of the number of floating point operations executed is desired. Although the loop shown herein is of infinite iterations for the purposes of clarity, modification thereof to terminate after a predetermined number of iterations have been performed is conventional.

```
while(true)
{
    tempA = tempC + tempC;
    tempH = tempC * tempC;
    tempB = tempC * tempC - xLocation;
    tempA = tempA * tempD + yLocation;
    tempH = tempD * tempD + tempH
    tempB = tempD * tempD - tempB;
    tempC = tempA + tempA;
    tempD = tempA * tempA - Xlocation;
    tempC = tempC * tempB + Ylocation;
```

-continued

```
    tempD = tempB * tempB - tempD;
} /* end while*/
```

Original assembly code

Shown below is the assembly code produced by compiling the above described source code (comments and labels have been added for clarity). This source code is designated to execute on an IBM/Motorola "Power PC model 601" processor chip.

```
Start:  fadd    fp1,fp3,fp3
        stw     r0,r0           ; Integer bubble
        fmul    fp5,fp3,fp3
        stw     r0,r0           ; Integer bubble
        fmsub   fp2,fp3,fp3,fp0
        fmadd   fp1,fp1,fp4,fp31
        fmadd   fp5,fp4,fp4,fp5
        fmsub   fp2,fp4,fp4,fp2
        fadd    fp3,fp1,fp1
        fmsub   fp4,fp1,fp1,fp0
        fmadd   fp3,fp3,fp2,fp31
        fmsub   fp4,fp2,fp2,fp4
        cror    cro_EQ,cr0_GT,cr0_EQ
        bne     Start
```

In the above example, two "placeholder" op-codes (stw r0,r0) have been inserted to fill integer bubbles by the compiler. According to the techniques of the present invention, an integer tabulation instruction for counting floating point instructions executed is inserted into the source code at a location corresponding to one of the integer bubbles as shown below.

Source code with tabulator inserted

```
while(true)
{
    tempA = tempC + tempC;
    floatCnt += 10;                     // tabulator
    tempH = tempC * tempC;
    tempB = tempC * tempC - xLocation;
    tempA = tempA * tempD + yLocation;
    tempH = tempD * tempD + tempH
    tempB = tempD * tempD - tempB;
    tempC = tempA + tempA;
    tempD = tempA * tempA - xLocation;
    tempC = tempC * tempB + yLocation;
    tempD = tempB * tempB - tempD;
} /* end while*/
```

The "floatCnt" source code tabulation instruction is inserted in the source code at the location corresponding to the first integer bubble. As shown in the above discussed assembly code listing, the first bubble is located between the first two floating point operations and thus the integer tabulator is inserted in the corresponding source code position.

Each time the above shown loop is executed, ten floating point instructions are executed and thus the "floatCnt" variable is incremented by 10. This is performed using an integer op-code as shown below in the compiled version of the program with an integer tabulator instruction inserted in place of the bubble.

Assembly code with tabulator inserted

```
Start:  fadd    fp1,fp3,fp3
        addi    r29,r29,10      ; integer add
                                ; of floating point
                                ; tabulator
        fmul    fp5,fp3,fp3
        stw     r0,r0           ; remaining integer bubble
        fmsub   fp2,fp3,fp3,fp0
        fmadd   fp1,fp1,fp4,fp31
        fmadd   fp5,fp4,fp4,fp5
        fmsub   fp2,fp4,fp4,fp2
        fadd    fp3,fp1,fp1
        fmsub   fp4,fp1,fp1,fp0
        fmadd   fp3,fp3,fp2,fp31
        fmsub   fp4,fp2,fp2,fp4
        cror    cro_EQ,cr0_GT,cr0_EQ
        bne     Start
```

Thus, the above assembly code, when executed, tabulates the floating point instructions executed, using an integer operation and without affecting execution performance (i.e., slowing up execution speed) of the surrounding (e.g., floating point) instructions. As a further example, the remaining integer bubble could be used to perform further tabulation of, e.g., integer instructions executed within the loop (however, there are none in this example).

Figure 2:
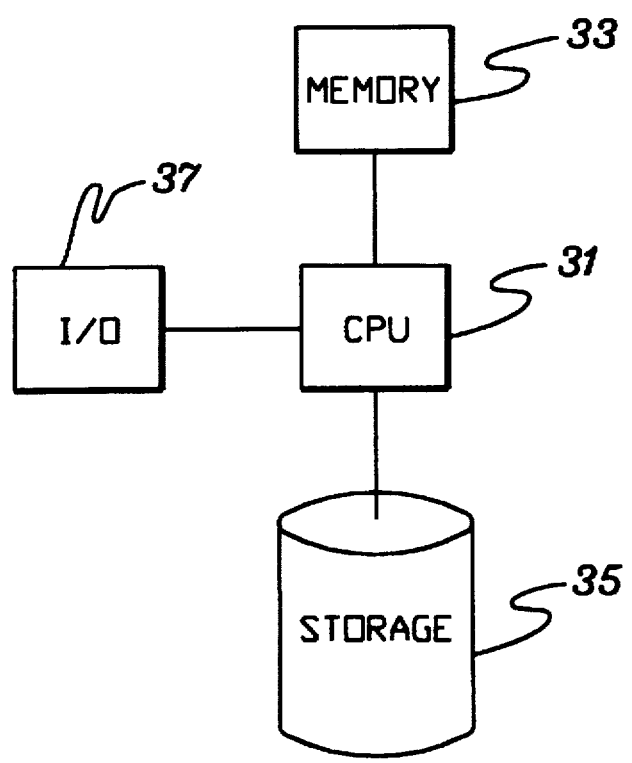
FIG. 2 is a diagram of a computer system useful in implementing the techniques of the present invention.

The hardware elements of a computer system used to implement the techniques of the present invention are shown in FIG. 2. A central processing unit ("CPU") 31 provides main processing functionality. A memory 33 is coupled to CPU 31 for providing operational storage of programs and data. Memory 33 may comprise, for example, random access memory ("RAM") or read only memory ("ROM"). Non-volatile storage of, for example, data files and programs is provided by a storage 35 that may comprise, for example, disk storage. Both memory 33 and storage 35 comprise a computer useable medium that may store computer program products in the form of computer readable program code. User input and output is provided by an input/output ("I/O") facility 37. I/O facility 37 may include, for example, a graphical display, a mouse and/or a graphics tablet. As an example, the design system of FIG. 2 may comprise an International Business Machines Personal Power Systems Power PC Model 604 computer executing a NT operating system.

The present invention has many advantages and features associated with it. By using bubbles or voids in compiled program code to identify locations for tabulation instructions, the art of performance analysis has been advanced. The instructions which are inserted into these bubbles and which perform instruction tabulation execute in zero effective time with respect to the surrounding code. Thus, performance is calculated in real time, during execution of the code segment under study, using only software. All of this is achieved without degrading the execution performance of the code segment under study. Through the use of these techniques, performance measurements are more easily obtained, are more accurate, and thus present a fairer comparison of processor performance.

While the invention has been described in detail herein, in accordance with certain preferred embodiments thereof, many modifications and changes therein may be affected by those skilled in the art. Accordingly, it is intended by the following claims to cover all such modifications and changes as fall within the true spirit and scope of the invention.

I claim:

1. A method for operating a processor of a digital computer to tabulate instruction execution of a code segment executing thereon, said processor having multiple execution units, said method comprising:
  (a) compiling said code segment for optimal execution performance without predefining space for at least one tabulation instruction, thereby producing compiled code;
  (b) identifying in the compiled code an unused time slot of one execution unit of said multiple execution units, said unused time slot existing during an execution of the compiled code on the processor;
  (c) inserting into the compiled code a tabulation instruction to be executed during said unused time slot by said one execution unit;
  (d) recompiling the compiled code with the inserted tabulation instruction, thereby producing recompiled code;
  (e) executing said recompiled code on said processor; and
  (f) during said executing (e), executing said tabulation instruction on said one execution unit of said processor, said tabulation instruction causing the processor to output a count of instructions executed by the processor for tabulating a count of instructions executed per unit of time, wherein said tabulation instruction is executed by a free resource of said processor identified subsequent to said compiling (a) and said optimal execution performance of said compiled code is not degraded by said recompiling (d) and executing of said tabulation instruction.

2. The method of claim 1, wherein said processor comprises a superscalar processor having a first execute unit and a second execute unit, and wherein said executing (e) comprises executing at least some of said recompiled code using said first execute unit, and wherein said one execute unit comprising said free resource comprises said second execute unit such that said executing (f) comprises executing said tabulation instruction using said second execute unit.

3. The method of claim 2, wherein said first execute unit comprises a floating point execute unit and said code segment includes a plurality of floating point instructions, and wherein said executing (f) comprises tabulating execution of said plurality of floating point instructions within a defined time interval.

4. The method of claim 3, wherein said second execute unit comprises an integer execute unit and said tabulation instruction comprises at least one integer instruction, and wherein said executing (f) comprises executing said at least one integer instruction using said integer execute unit to tabulate execution of said plurality of floating point instructions by said floating point execute unit within a defined time interval.

5. The method of claim 2, wherein said first execute unit comprises an integer execute unit and said code segment includes a plurality of integer instructions, and wherein said executing (f) comprises tabulating execution of said plurality of integer instructions within a defined time interval.

6. The method of claim 5, wherein said second execute unit comprises a floating point execute unit and said tabulation instruction comprises at least one floating point instruction, and wherein said executing (f) comprises executing said at least one floating point instruction using said floating point execute unit to tabulate instruction execution by said integer execute unit within said defined time interval.

7. A system for operating a processor of a digital computer to tabulate instruction execution of a first plurality of instructions executing thereon, said processor having multiple execution units, said system comprising:
  (a) means for compiling said first plurality of instructions for optimal execution performance, without predefining space for at least one tabulation instruction, and thereby producing compiled code;
  (b) means for identifying in the compiled code an unused time slot of one execution unit of said multiple execution units, said unused time slot existing during an execution of the compiled code on the processor;
  (c) means for inserting into the compiled code a tabulation instruction to be executed during said unused time slot by said one execution unit;
  (d) means for recompiling the compiled code with the inserted tabulation instruction, thereby producing recompiled code;
  (e) means for executing said recompiled code on said processor; and
  (f) means for, during said executing (e), executing said tabulation instruction on said one execution unit of said processor, said tabulation instruction causing the processor to output a count of instructions executed by the processor for tabulating a count of instructions executed per unit of time, wherein said tabulation instruction is executed by a free resource of said processor identified subsequent to compiling by said means for compiling (a) and said optimal execution performance of said first plurality of instructions is not degraded by said recompiling and executing of said tabulation instruction.

8. The system of claim 7, wherein said processor comprises a superscalar processor having a first execute unit and a second execute unit, and wherein said means for executing (e) comprises said first execute unit, and wherein said one execution unit comprising said free resource comprises said second execute unit.

9. The system of claim 8, wherein said first execute unit comprises a floating point execute unit and said first plurality of instructions includes a plurality of floating point instructions.

10. The system of claim 9, wherein said second execute unit comprises an integer execute unit and said tabulation instruction comprises at least one integer instruction.

11. The system of claim 8, wherein said first execute unit comprises an integer execute unit and said first plurality of instructions includes a plurality of integer instructions.

12. The system of claim 11, wherein said second execute unit comprises a floating point execute unit and said tabulation instruction comprises at least one floating point instruction.

13. A computer program product comprising a computer useable medium having computer readable program code means therein for use in operating a processor of a digital computer to tabulate instruction execution of a first plurality of instructions executing thereon, said processor having multiple execution units, said computer readable program code means in said computer program product comprising:
  first computer readable program code means for causing a computer to affect compiling of said first plurality of instructions for optimal execution performance without predefining space for at least one tabulation instruction, thereby producing compiled code;
  second computer readable program code means for causing a computer to affect identifying in the compiled code an unused time slot of one execution unit of said multiple execution units, said unused time slot existing during an execution of the compiled code on the processor;

third computer readable program code means for causing a computer to affect inserting into the compiled code a tabulation instruction to be executed during said unused time slot by said one execution unit;

fourth computer readable program code means for causing a computer to affect recompiling the compiled code with the inserted tabulation instruction, thereby producing recompiled code;

fifth computer readable program code means for causing a computer to affect executing said recompiled code on said processor; and sixth computer readable program code means for causing a computer to affect during said executing of said recompiled code, executing said tabulation instruction on said one execution unit of said processor, said tabulation instruction causing the processor to output a count of instructions executed by the processor for tabulating a count of instructions executed per unit of time, wherein said tabulation instruction is executed by a free resource of said processor identified subsequent to said compiling and said optimal execution performance of said compiled code is not degraded by said recompiling and executing of said tabulation instruction.

14. The method of claim 1, wherein said executing (f) comprises executing said tabulation instruction on the processor, said tabulation instruction tabulating a sum of instructions executed within a predefined interval on the processor.

15. The system of claim 7, wherein said means for executing (f) comprises means for executing said tabulation instruction for tabulating a sum of instructions executed within a predefined time interval.

16. The method of claim 1, wherein said code segment comprises a segment of source code normally executable by the processor, said compiled code comprises compiled source code, and said recompiled code comprises recompiled source code.

17. The method of claim 1, wherein said compiling (a) comprises compiling the code segment for execution by the processor in a first time duration, and wherein said executing (e) comprises executing the recompiled code, with the inserted tabulation instruction, on the processor within said first time duration.

18. The method of claim 1, wherein said inserting (c) comprises inserting into the compiled code only a single tabulation instruction to be executed during said unused time slot by said one execution unit.

19. The method of claim 1, wherein said one execution unit comprises a first execution unit and said multiple execution units of said processor comprise a second execution unit, and wherein said tabulation instruction is executed on said first execution unit and causes the processor to output a count of instructions executed by the second execution unit for tabulating the count of instructions executed thereby per unit of time.

20. The system of claim 7, wherein said first plurality of instructions comprises a segment of source code normally executable by the processor, said compiled code comprises compiled source code, and said recompiled code comprises recompiled source code.

21. The system of claim 7, wherein said means for compiling (a) comprises means for compiling the first plurality of instructions for execution by the processor in a first time duration, and wherein said means for executing (e) comprises means for executing the recompiled code, with the inserted tabulation instruction, on the processor within the first time duration.

22. The system of claim 7, wherein said means for inserting (c) comprises means for inserting into the compiled code only a single tabulation instruction to be executed during said unused time slot by said one execution unit.

23. The system of claim 7, wherein said one execution unit comprises a first execution unit and said multiple execution units of said processor comprise a second execution unit, and wherein said tabulation instruction is executed on said first execution unit and causes the processor to output a count of instructions executed by the second execution unit for tabulating the count of instructions executed thereby per unit of time.

24. A method for determining a processor performance of a microprocessor having multiple execution units, said method comprising:

(a) compiling a segment of code normally executable by the processor, thereby producing compiled code;

(b) identifying in the compiled code an unused time slot of one execution unit of said multiple execution units, said unused time slot existing during an execution of the compiled code on the processor;

(c) inserting into the compiled code a tabulation instruction to be executed during said unused time slot by said one execution unit;

(d) recompiling the compiled code with the inserted tabulation instruction, thereby producing recompiled code;

(e) executing the recompiled code with the inserted tabulation instruction on the processor; and (f) wherein the tabulation instruction causes the processor to output a count of instructions executed by the processor for tabulating a count of instructions executed per unit of time.

25. The method of claim 24, wherein said segment of code comprises a segment of source code normally executable by the processor, said compiled code comprises compiled source code, and said recompiled code comprises recompiled source code.

26. The method of claim 24, wherein said compiling (a) comprises compiling the segment of code for execution by the processor in a first time duration, and wherein said executing (e) comprises executing the recompiled code, with the inserted tabulation instruction, on the processor within said first time duration.

27. The method of claim 24, wherein said inserting (c) comprises inserting into the compiled code only a single tabulation instruction to be executed during said unused time slot by said one execution unit.

28. The method of claim 24, wherein said one execution unit comprises a first execution unit and said multiple execution units of said processor comprise a second execution unit, and wherein said tabulation instruction causes the processor to output a count of instructions executed by the second execution unit in the processor for tabulating the count of instructions executed thereby per unit of time.

29. A system for determining a processor performance of a microprocessor having multiple execution units, said system comprising:

(a) means for compiling a segment of code normally executable by the processor, thereby producing compiled code;

(b) means for identifying in the compiled code an unused time slot of one execution unit of said multiple execution units, said unused time slot existing during an execution of the compiled code on the processor;

(c) means for inserting into the compiled code a tabulation instruction to be executed during said unused time slot by said one execution unit;

(d) means for recompiling the compiled code with the inserted tabulation instruction, thereby producing recompiled code;

(e) means for executing the recompiled code with the inserted tabulation instruction on the processor; and (f) wherein the tabulation instruction causes the processor to output a count of instructions executed by the processor for tabulating a count of instructions executed per unit of time.

30. The system of claim 29, wherein said segment of code comprises a segment of source code normally executable by the processor, said compiled code comprises compiled source code, and said recompiled code comprises recompiled source code.

31. The system of claim 29, wherein said means for compiling (a) comprises means for compiling the segment of code for execution by the processor in a first time duration, and wherein said means for executing (e) comprises means for executing the recompiled code, with the inserted tabulation instruction, on the processor within said first time duration.

32. The system of claim 29, wherein said means for inserting (c) comprises means for inserting into the compiled code only a single tabulation instruction to be executed during said unused time slot by said one execution unit.

33. The system of claim 29, wherein said one execution unit comprises a first execution unit and said multiple execution units of said processor comprise a second execution unit, and wherein said tabulation instruction causes the processor to output a count of instructions executed by the second execution unit in the processor for tabulating the count of instructions executed thereby per unit of time.

* * * * *